(12) United States Patent
Mitomi et al.

(10) Patent No.: US 8,302,723 B2
(45) Date of Patent: Nov. 6, 2012

(54) VEHICLE SHROUD

(75) Inventors: Takane Mitomi, Tokyo (JP); Tadashi Inose, Tokyo (JP); Satoshi Oohashi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 52 days.

(21) Appl. No.: 12/656,169

(22) Filed: Jan. 20, 2010

(65) Prior Publication Data
US 2010/0181133 A1    Jul. 22, 2010

(30) Foreign Application Priority Data

Jan. 20, 2009    (JP) .................................. 2009-009437

(51) Int. Cl.
B62D 61/02    (2006.01)

(52) U.S. Cl. ...................................... 180/229; 180/68.1

(58) Field of Classification Search .................. 180/229, 180/68.3, 68.1, 68.6, 68.4; 296/78.1, 192
See application file for complete search history.

(56) References Cited

U.S. PATENT DOCUMENTS

| | | | |
|---|---|---|---|
| 6,651,769 B2 * | 11/2003 | Laivins et al. ................ 180/229 |
| 7,654,357 B2 * | 2/2010 | Buell et al. ..................... 180/229 |
| 7,686,116 B2 * | 3/2010 | Oohashi et al. ............... 180/219 |
| 2006/0000652 A1 * | 1/2006 | Yamaguchi et al. ......... 180/68.3 |
| 2006/0175112 A1 * | 8/2006 | Yoshida et al. ............... 180/229 |
| 2006/0254844 A1 * | 11/2006 | Nakashima et al. .......... 180/229 |
| 2008/0156566 A1 * | 7/2008 | Oohashi et al. ............... 180/229 |
| 2009/0008182 A1 * | 1/2009 | Buell et al. .................... 180/229 |

FOREIGN PATENT DOCUMENTS

JP    2006-282050    10/2006
* cited by examiner

*Primary Examiner* — Tashiana Adams
(74) *Attorney, Agent, or Firm* — Rabin & Berdo, P.C.

(57) ABSTRACT

A vehicle shroud can include a front projection, a middle projection and a rear projection. In a side view of the vehicle shroud, the front projection can be approximately wedge-shaped, and the middle projection can extend downward.

20 Claims, 8 Drawing Sheets

VEHICLE SHROUD

CROSS-REFERENCE TO RELATED APPLICATIONS

This application claims priority under 35 U.S.C. §119 from Japanese Patent Application No. JP2009-009437, filed Jan. 20, 2009, the entirety of which is incorporated herein by reference.

BACKGROUND OF THE INVENTION

1. Field of the Invention

Embodiments of the present invention relate to a vehicle, and more particularly to a shroud for the vehicle. In embodiments, the vehicle can be a motorcycle.

2. Description of Related Art

Certain off-road-type motorcycles, such as motocrosser-type motorcycles, have a cover called a shroud. An example is described in JP 2006-282050 A, for instance. The shroud covers the sides of a front portion of the motorcycle, and serves to supply air flow from the front of the motorcycle to the engine. If the motorcycle has a water-cooled engine, the shroud supplies the air flow to the radiator.

SUMMARY OF THE INVENTION

Embodiments of the invention relate to a shroud for a vehicle, such as a motorcycle, that can effectively take in and discharge air to, among other things, better cool the motorcycle. A motorcycle according to embodiments of the invention can comprise a front wheel, a front fork for supporting the front wheel, an under bracket coupled to the front fork, and a steering shaft coupled to the front fork via the under bracket. The motorcycle according to the embodiments can further comprise a head pipe for rotatably supporting the steering shaft, a frame extending from the head pipe obliquely downward and rearward, as viewed from one side of the motorcycle, and a shroud. The shroud can cover a side of a portion of the frame, extend frontward, and extend outward with respect to a widthwise direction of the motorcycle.

The shroud can comprise a front end portion, a front edge portion, a vertical portion, and a lower edge portion. The front end portion can be located above a lower end of the under bracket and frontward of a rear end of the front fork, as viewed from one side of the motorcycle. The front edge portion can extend from the front end portion obliquely downward and rearward, as viewed from one side of the motorcycle. The vertical portion can extend vertically upward from a location rearward of a lower end of the front edge portion, as viewed from one side of the motorcycle. The lower edge portion can extend substantially horizontally rearward from an upper end of the vertical portion, as viewed from one side of the motorcycle, and can extend astride the frame.

Embodiments of the invention further relate to a vehicle shroud, which can comprise an upper portion including an upper front portion, and a lower portion including a lower front portion. In a side view of the vehicle shroud, the upper front portion and the lower front portion can together form a forward-projecting wedge shape. The lower portion, in approximately a middle part thereof, can include a downward-projecting portion. The lower portion can further include a rearward-projecting portion. An opening having an approximately triangular shape can be formed in the lower portion.

Embodiments of the invention still further relate to a vehicle shroud that can comprise a front projection, a middle projection, and a rear projection. In a side view of the vehicle shroud, the front projection can be approximately wedge-shaped, and the middle projection can extend downward. Further, in a side view of the vehicle shroud, first and second openings each having an approximately triangular shape can be formed, in approximately a center portion of the vehicle shroud. The first opening can extend at least partly over the middle projection, and the second opening can extend substantially along the rear projection.

With the above-described structures, improved handling of air flow against the front of the motorcycle can be realized. More specifically, the shroud can smoothly discharge air that has been taken inside the shroud to the outside of the shroud, and increase the amount of the air flowing from the shroud to the rear, thereby improving the cooling performance of the engine, for example. Other features, elements, steps, characteristics and advantages of the invention will become more apparent from the following detailed description of embodiments of the invention with reference to the attached drawings.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately"

means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "frontward," "ahead," "back," "rear," "rearward," "behind," "right," "left," "above," "below," "up," "upward," "down," "downward," "forward," "backward," "widthwise," "lengthwise," "horizontal" and "vertical." As used herein, these terms reflect the perspective of a person facing in the direction indicated by the arrow labeled "FWD" in the drawings, such as a rider seated on or straddling the motorcycle 1 and facing toward the front wheel 3. Thus, the arrow labeled "FWD" indicates a back-to-front direction relative to the motorcycle 1, or an advancing direction of the motorcycle 1. A direction specified as "left" or "right" in the description refers to left or right with respect to the FWD direction or a direction opposite (e.g. 180 degrees from) to the FWD direction. "Widthwise" corresponds to a direction substantially transverse to the FWD direction or to a direction opposite to the FWD direction, e.g., a left-to-right or right-to-left direction. "Lengthwise" (with respect to the motorcycle 1) corresponds substantially to the FWD direction or to a direction opposite to the FWD direction. "Vertical" refers to a direction substantially transverse to both the widthwise and lengthwise directions, and corresponds substantially to "upward" and/or "downward." "Horizontal" refers to a direction substantially transverse to the vertical direction, and corresponds substantially to the FWD direction or to a direction opposite to the FWD direction.

First Exemplary Embodiment

Figure 1:
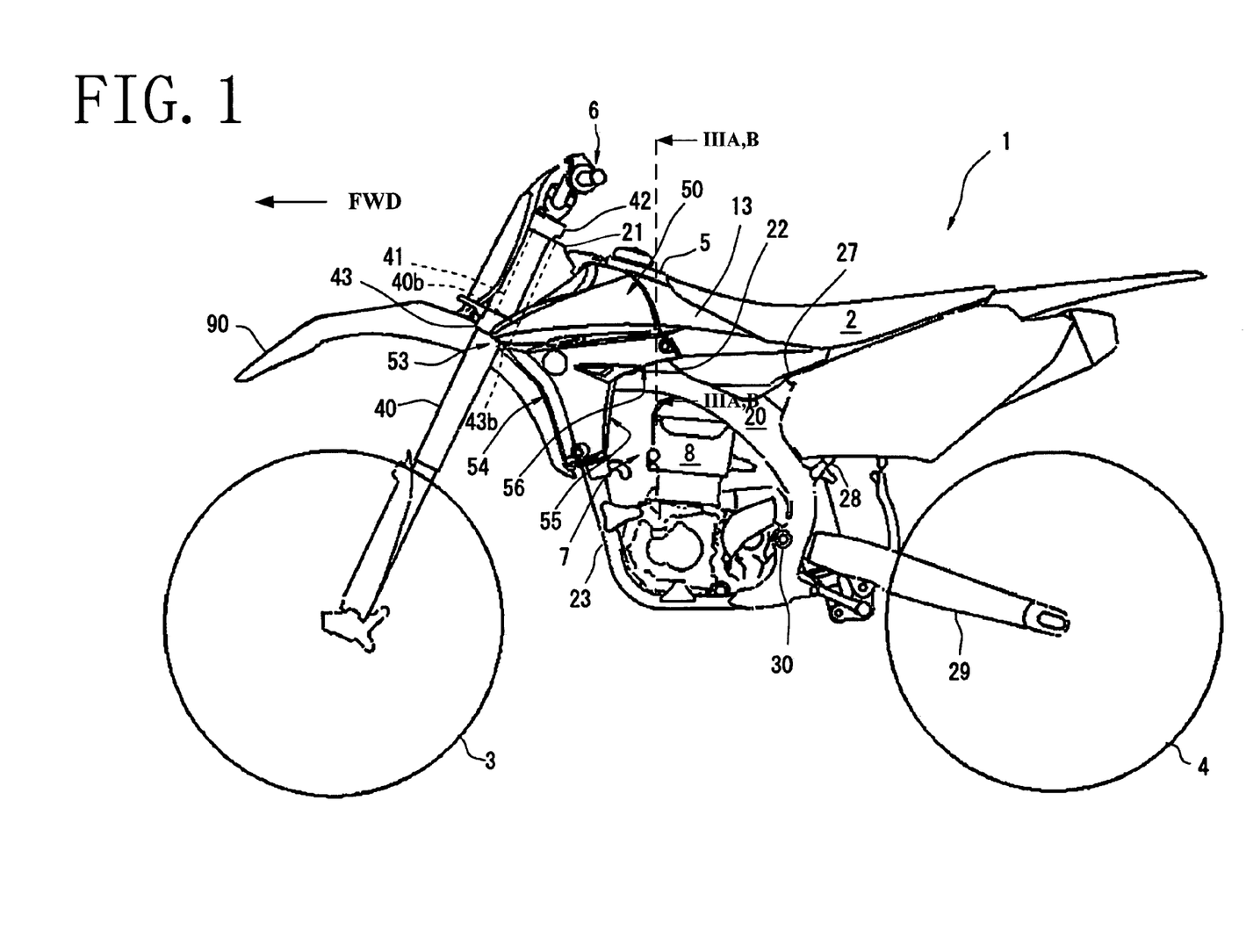
FIG. 1 is a side view illustrating a motorcycle according to a first exemplary embodiment of the invention.

FIG. 1 is a left side view illustrating a motorcycle 1 according to a first exemplary embodiment. An overview of the configuration of the motorcycle 1 follows, with reference to FIG. 1.

FIG. 1 illustrates an example of what is commonly termed a "motocrosser"-type motorcycle. However, embodiments of the invention are not limited to any particular kind of motorcycle or vehicle, and could be realized, for example, in an on-road-type motorcycle, a scooter-type motorcycle, a moped-type motorcycle, or other type of motorcycle or vehicle.

Figure 4:
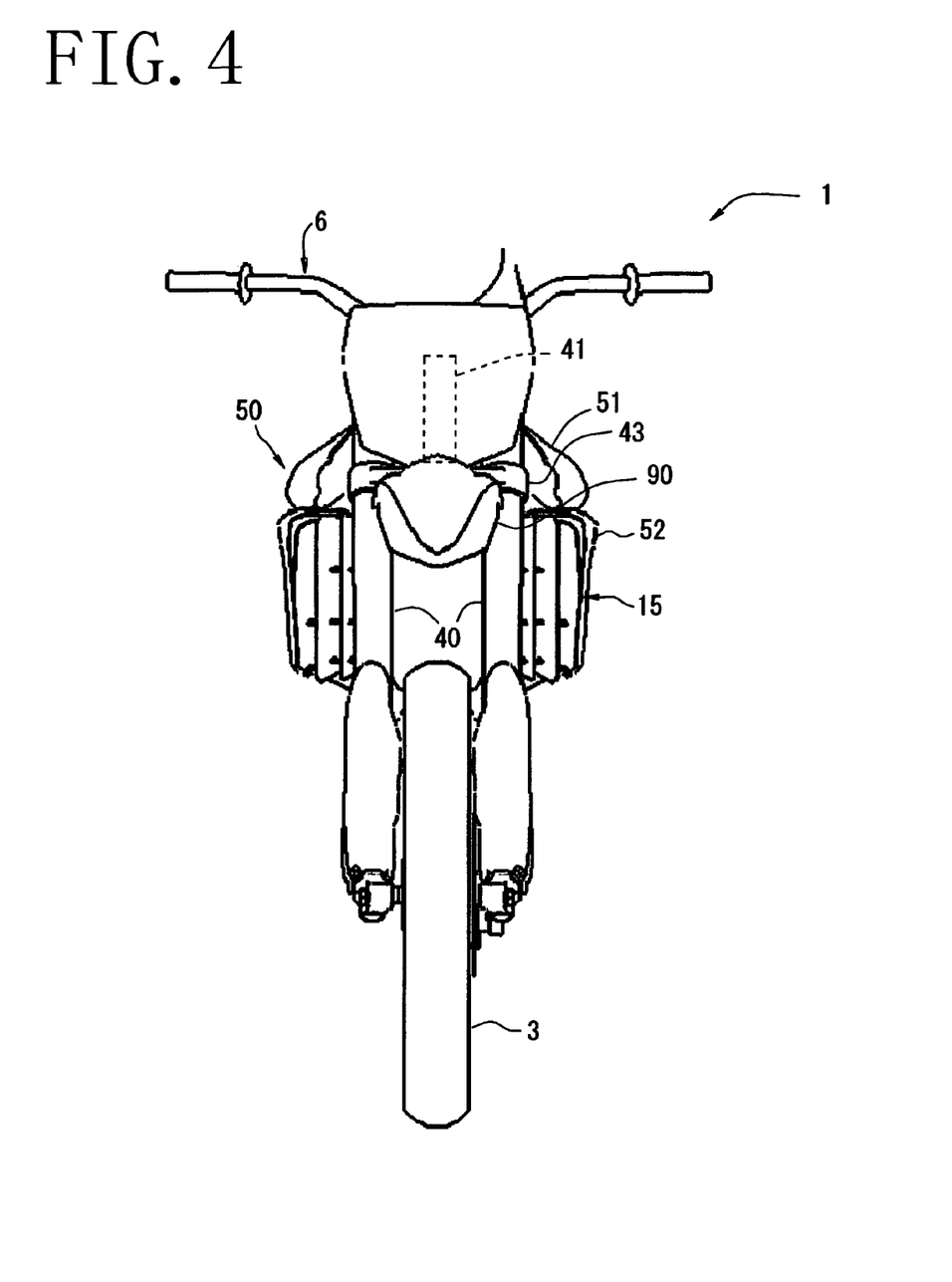
FIG. 4 is a front view illustrating the motorcycle according to the first exemplary embodiment.

The motorcycle 1 can be equipped with a vehicle body frame 20 forming a framework. The motorcycle 1 can further be equipped with a seat 2 for seating a rider, a front wheel 3, and a rear wheel 4. The front wheel 3 can be disposed at a front portion of the motorcycle 1, and be supported by a front fork 40. The front fork 40 can include a pair of left and right fork tubes, and the front wheel 3 can be disposed between the left and right fork tubes (see FIG. 4). The front fork 40 can slope rearward from a substantially vertical direction as viewed from one side of the motorcycle, and can absorb shocks from the road surface received by the front wheel 3. When absorbing a shock, the front wheel 3 can move in accordance with movements of the front fork 40.

A steering shaft 41 can be provided at substantially a central position between the left and right fork tubes of the front fork 40, as viewed from the front of the motorcycle. The steering shaft 41 can extend along a slope substantially the same as that of front fork 40, between an upper bracket 42 and an under bracket 43. The front fork 40, the upper bracket 42, and the under bracket 43 can be coupled to each other. The steering shaft 41 can be coupled to the front fork 40 via the under bracket 43 and the upper bracket 42.

The motorcycle 1 can include a head pipe 21 that rotatably supports the steering shaft 41. The vehicle body frame 20 can extend from the head pipe 21 obliquely downward and rearward, as viewed from one side of the motorcycle.

The motorcycle 1 can further include a shroud 50. The shroud 50 can cover a side of a portion of the vehicle body frame 20, extend frontward, and extend outward in widthwise direction of the motorcycle 1. The shroud 50 can include a pair of members: a left-side shroud and a right-side shroud.

Figure 2:
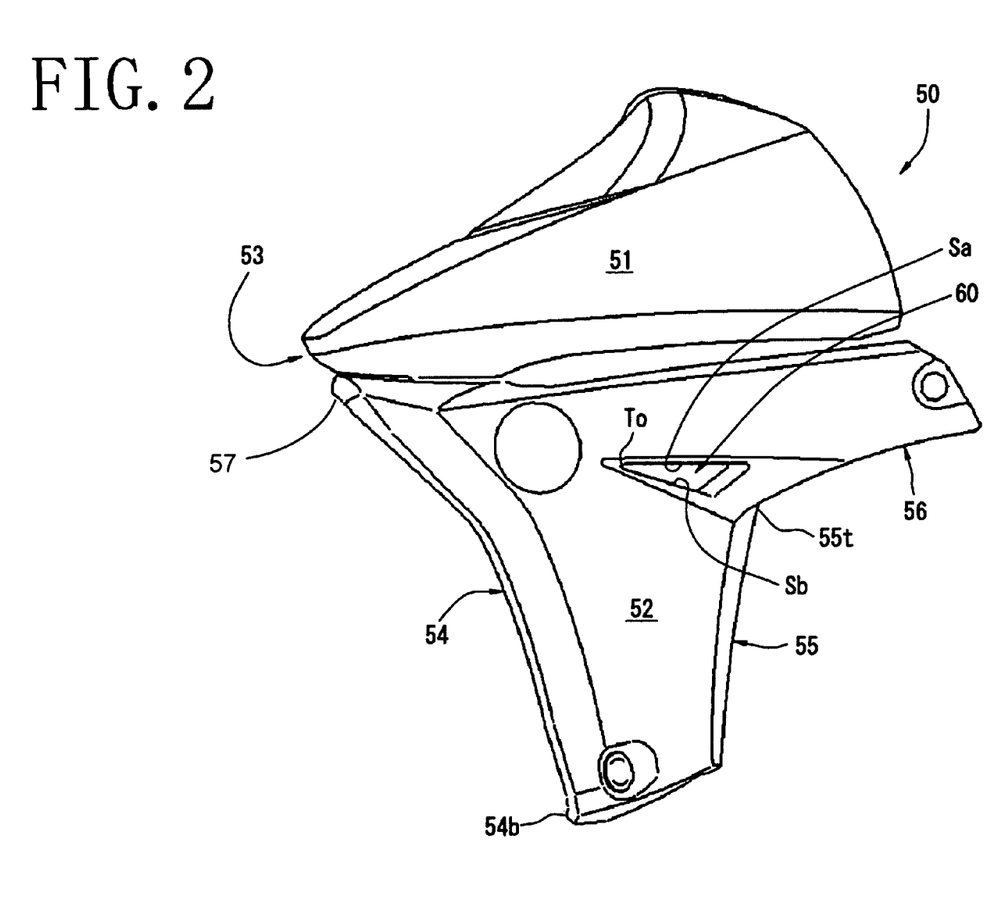
FIG. 2 is a side view illustrating a left-side shroud according to the first exemplary embodiment.

As illustrated in FIGS. 1 and 2, the shroud 50 can include a front end portion 53 that protrudes frontward, as viewed from one side of the motorcycle. The front end portion 53 can be located above a lower end 43b of the under bracket 43 and frontward of a rear end 40b of the front fork 40. The rear end 40b can be at least partly covered by the front end portion 53 of the shroud 50.

The shroud 50 can further include a front edge portion 54, a vertical portion 55, and a lower edge portion 56. The front edge portion 54 can extend from the front end portion 53 obliquely downward and rearward. The vertical portion 55 can extend upwardly from a location rearward of a lower end 54b of the front edge portion 54. The vertical portion 55 can extend substantially vertically upward, as viewed from one side of the motorcycle.

The lower edge portion 56 can extend, in a substantially front-to-rear direction, from an upper end 55t of the vertical portion 55. Put another way, the lower edge portion 56 can extend substantially horizontally rearward, as viewed from one side of the motorcycle. As illustrated in FIG. 1, the lower edge portion 56 extends over and along a main frame 22 of the motorcycle 1, as viewed from one side of the motorcycle. Viewed from the opposite side (the right side), the lower edge portion 56 would likewise extend over and along the main frame 22 (see FIGS. 3A and 3B). Thus, the lower edge portions 56 of the left-side shroud and right-side shrouds can be said to straddle or "extend astride" the vehicle body frame 20 and main frame 22, in the sense that the lower edge portions 56 of the left-side shroud and right-side shrouds can be situated on both sides of the vehicle body frame 20 and main frame 22.

As illustrated in FIG. 1, the vehicle body frame 20 can include the main frame 22 and a down frame 23. The main frame 22 can extend from the head pipe 21 obliquely downward and rearward, as viewed from one side of the motorcycle. Below the main frame 22, the down frame 23 can extend from the head pipe 21 obliquely downward and rearward, as viewed from one side of the motorcycle.

The upper bracket 42 can be located above the head pipe 21. A steering handle 6 can be provided above the head pipe 21 and the upper bracket 42. The steering handle 6 can be coupled to the upper bracket 42.

In the motorcycle 1, the main frame 22 can be configured to have a pair of portions, e.g., left and right frame portions. Alternatively, the main frame 22 can comprise or be formed as a single, integral or unitary frame. In the latter case, the main frame 22 can extend, as viewed from above, along the same line as a center line that connects widthwise center points of the motorcycle 1. For example, the center line can connect a center point, with respect to the widthwise direction, of the front wheel 3, and a center point, with respect to the widthwise direction, of the steering shaft 41, as viewed from either above or below.

Figure 3A:
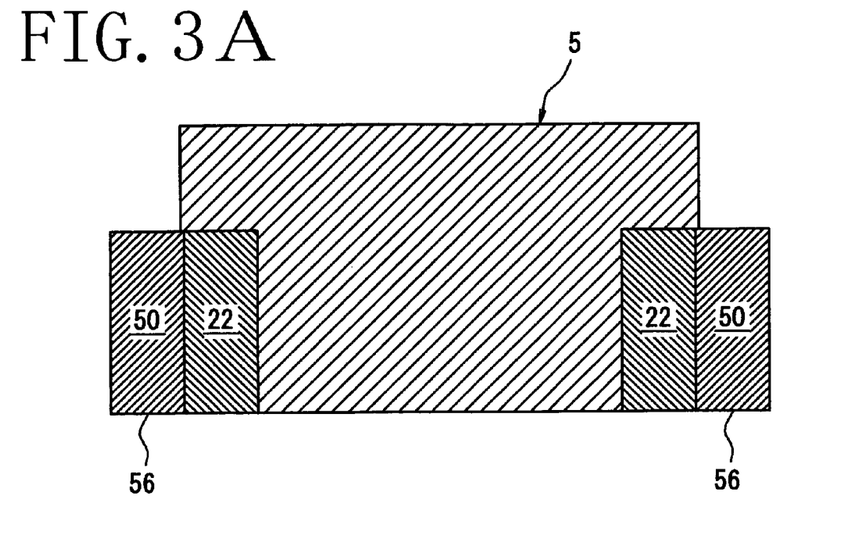
FIG. 3A is a schematic cross-sectional view showing left and right main frame portions according to the first exemplary embodiment.
Figure 3B:
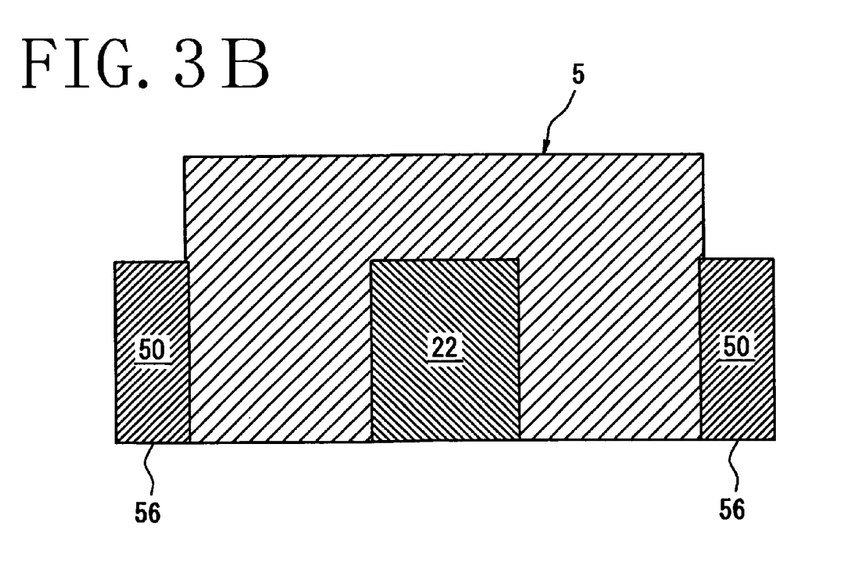
FIG. 3B is a schematic cross-sectional view showing a main frame with a unitary construction, according to an alternative embodiment.

FIG. 3A is a view illustrating a cross section, taken along the line IIIA,B as shown in FIG. 1, for an embodiment in which the main frame 22 of the vehicle body frame 20 can comprise left and right portions. FIG. 3B is a view illustrating a cross section, taken along the line IIIA,B, for an alternative embodiment, in which the main frame 22 of the vehicle body frame 20 can be formed as a single, integral or unitary frame. As illustrated in FIGS. 3A and 3B, the lower edge portions 56 of the left-side shroud 50 and right-side shroud 50 can straddle or at least partly overlap the main frame 22.

Referring now to FIG. 1, a pair of left and right seat rails 27 can be connected to the main frame 22. The seat rails 27 can extend obliquely upward and rearward. A backstay 28 can be connected to a portion of the main frame 22 that is lower than a portion thereof at which the seat rails 27 are connected. The backstay 28 can include a pair of portions, e.g., left and right portions. A rear arm 29 can be coupled to a lower end portion of the main frame 22 via a pivot shaft 30. The rear wheel 4 can be rotatably fitted to a rear end portion of the rear arm 29.

A fuel tank 5 can be mounted above the main frame 22 and the backstay 28 so as to span the main frame 22 and the backstay 28. The fuel tank 5 can be disposed rearward of the head pipe 21. The seat 2 can be provided above and to the rear of the fuel tank 5, as viewed from one side of the motorcycle.

The motorcycle 1 can include an engine 7 having a cylinder 8. The vertical portion 55 of the shroud 50 can be located at a position spaced frontward from the cylinder 8, as viewed from one side of the motorcycle. As illustrated in FIG. 1, the cylinder 8 and the vertical portion 55 are not in contact with each other. The lower edge portion 56 can be located at a position spaced upward from the cylinder 8, as viewed from one side of the motorcycle. As illustrated in FIG. 1, the cylinder 8 and the lower edge portion 56 can be arranged, as viewed from one side of the motorcycle, so as to not be in contact with each other.

The motorcycle 1 can include a front fender 90. The front fender 90 can cover a region over the front wheel 3, and be fitted to the under bracket 43. The front fender 90 can be stationary relative the front fork 40. For example, when the front fork 40 moves to accommodate shocks, the front fender 90 can be stationary relative to the movement of the front fork 40.

As illustrated in FIG. 2, the shroud 50 can comprise an upper shroud 51 and a lower shroud 52, located below the upper shroud 51. The front end portion 53 can be formed in the upper shroud 51, in a front portion of the upper shroud 51. A front end portion 57 of the lower shroud 52 can form a part of the front edge portion 54. The front end portion 57 of the front edge portion 54 can be located rearward of the front end portion 53. In other words, the front end of the upper shroud 51 can be located frontward of the front end of the lower shroud 52.

In the embodiment under discussion, the front edge portion 54, the vertical portion 55, and the lower edge portion 56 can be formed in, or form portions of, the lower shroud 52. In addition, as illustrated in FIG. 1, the lower shroud 52 can be disposed so as to at least partly overlap the main frame 22, as viewed from one side of the motorcycle. In other words, the lower shroud 52 can cover at least a front portion of the main frame 22. More specifically, the lower edge portion 56 and the vertical portion 55 of the lower shroud 52 can overlap a portion of the main frame 22 in such a manner that the vertical portion 55 can cover at least a lower portion of the main frame 22, and the lower edge portion 56 can cover at least an upper portion of the main frame 22.

As illustrated in FIG. 2, an opening 60 can be formed in the shroud 50.

The opening 60 can have a first side Sa and a second side Sb, and can be formed in a substantially triangular shape. The first side Sa can extend from a top or front point T0 obliquely downward and rearward. In a region below the first side Sa, the second side Sb can extend from the top point T0 obliquely downward and rearward. The top point T0 can be located at a front end of the opening 60.

Put another way, the shroud 50 can comprise an upper portion 51 including an upper front portion, and a lower portion 52 including a lower front portion. In a side view of the shroud 50, the upper front portion and the lower front portion can together form a forward-projecting wedge shape defined at least partly by front end portions 53 and 57. The lower portion 52, in approximately a middle part thereof, can include a downward-projecting portion 55. The lower portion 52 can further include a rearward-projecting portion defined at least partly by an edge 56. An opening 60 having an approximately triangular shape can be formed in the lower portion 52, and extend at least partly over the downward-projecting portion 55.

Figure 5:
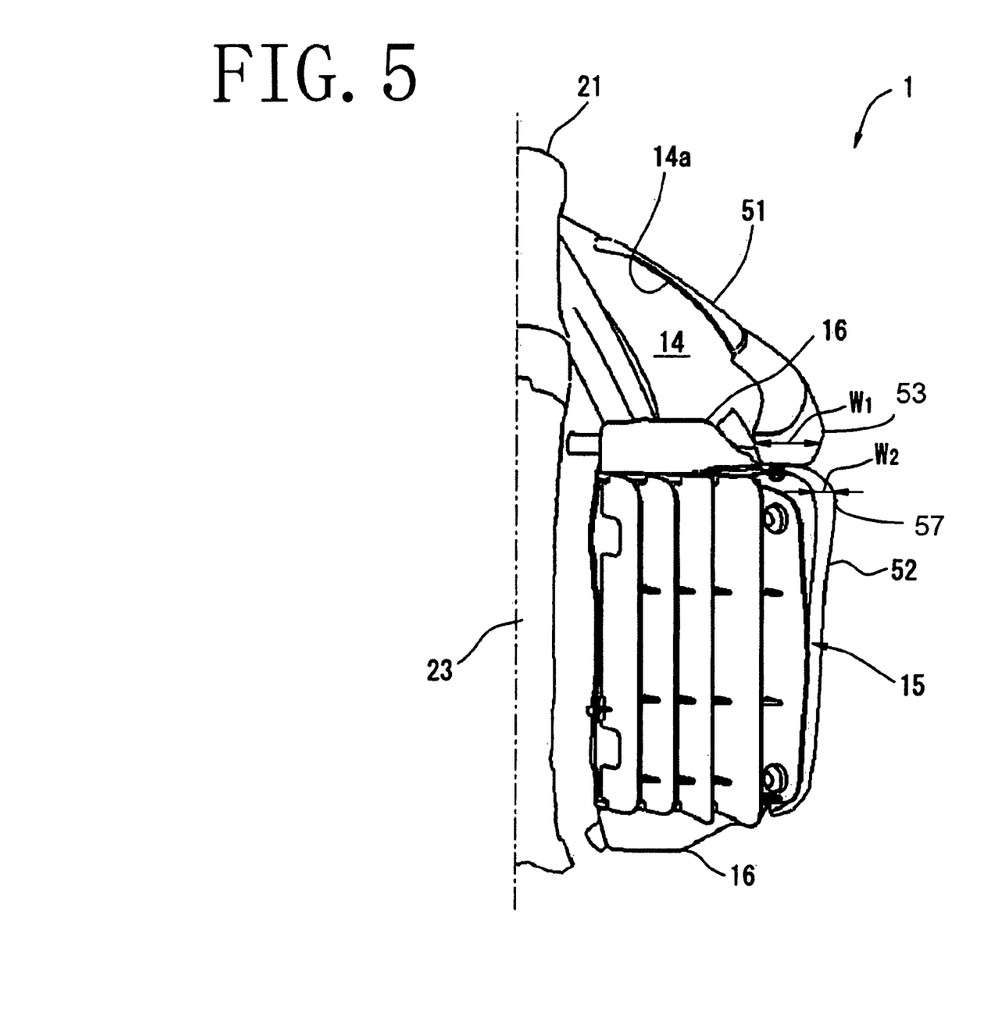
FIG. 5 is a front view illustrating an enlarged portion of the view of FIG. 4.

Referring now to FIG. 5, the motorcycle 1 can include an intake duct 14. In the embodiment under discussion, the intake duct 14 can form an inward portion of the upper shroud 51. The intake duct 14 can include an intake port 14a that opens toward an inward portion of the motorcycle, with respect to the widthwise direction.

As illustrated in FIG. 5, a width W1 of the front end portion 53 of the upper shroud 51 along the widthwise direction can be greater than a width W2 of the front end portion 57 of the lower shroud 52 along the widthwise direction. The width W1 can correspond to a thickness of the upper shroud 51. Likewise, the width W2 can correspond to a thickness of the lower shroud 52.

Figure 6A:
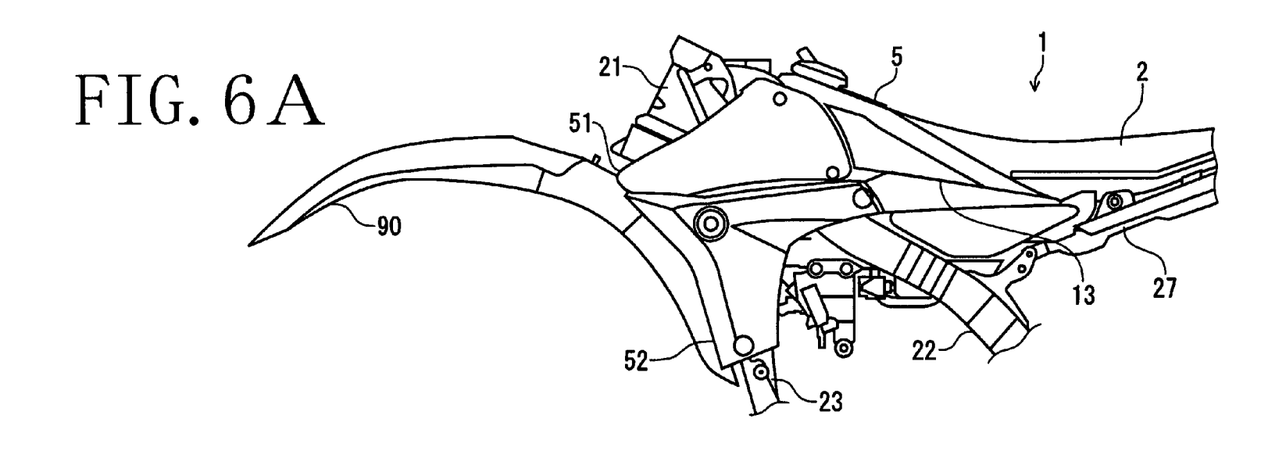
FIG. 6A shows a partial side view of the motorcycle according to the first exemplary embodiment with a shroud attached.
Figure 6B:
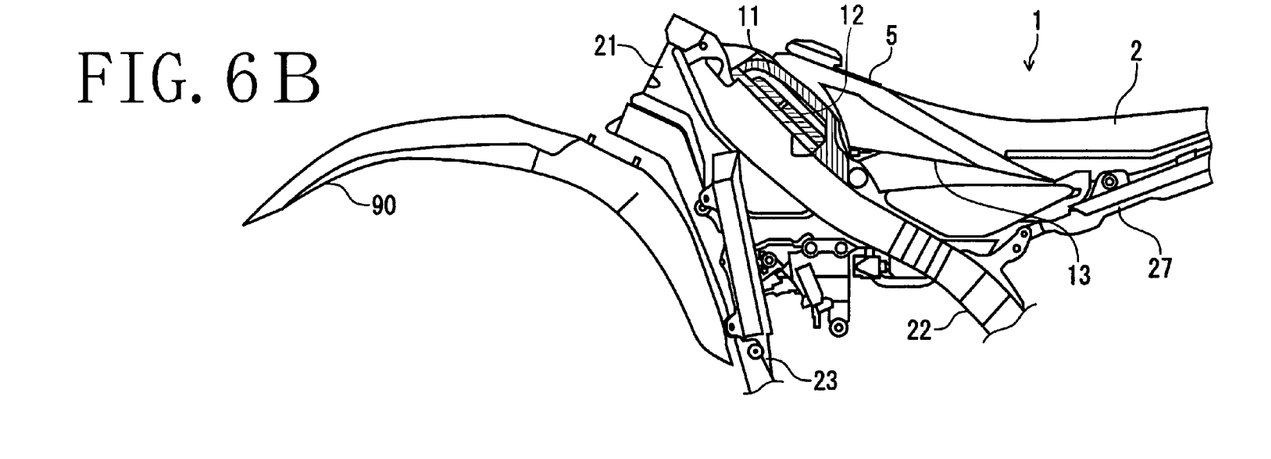
FIG. 6B shows a partial side view of the motorcycle according to the first exemplary embodiment with the shroud removed.
Figure 7:
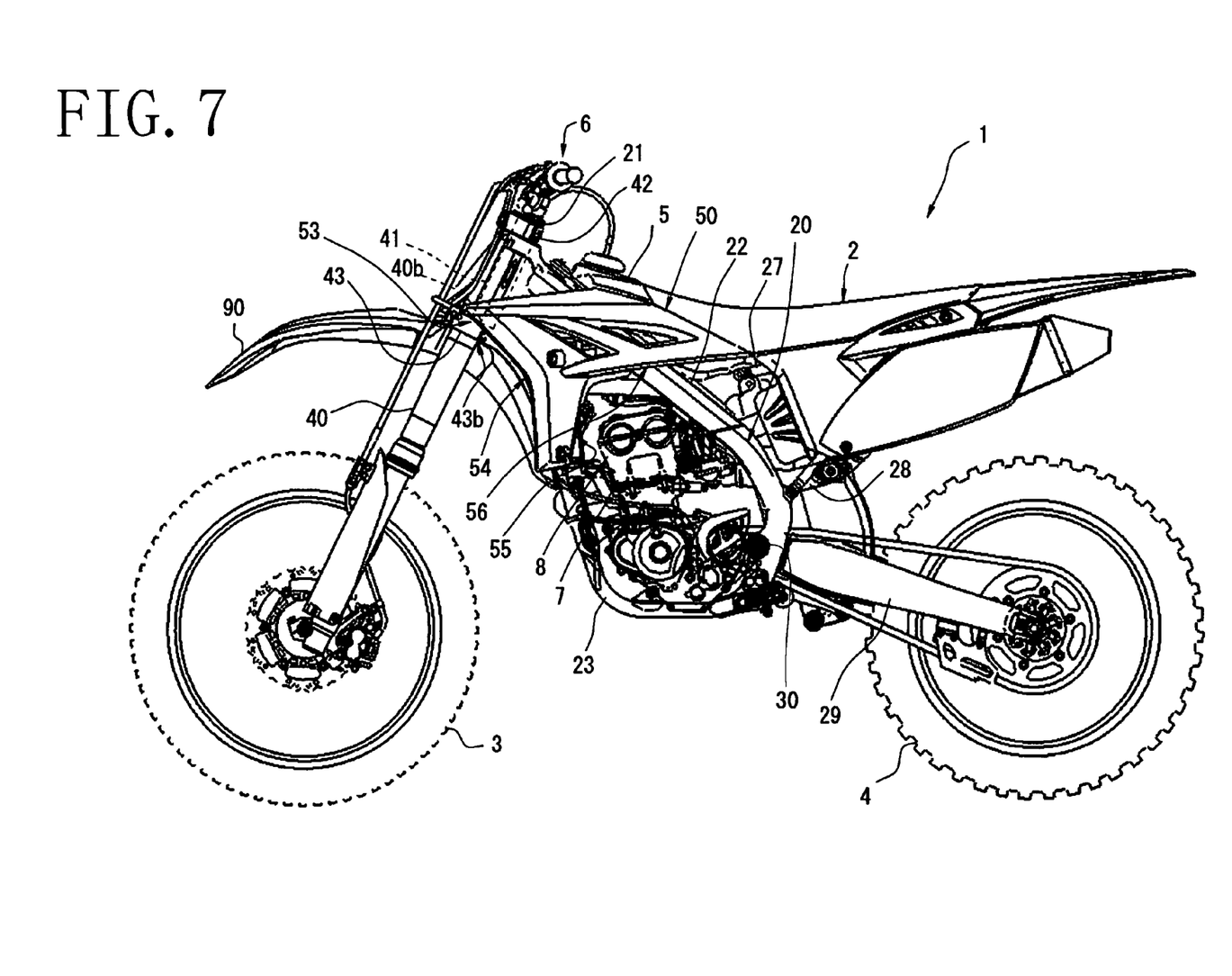
FIG. 7 is a side view illustrating a motorcycle according to a second exemplary embodiment of the invention.

Referring now to FIG. 6B, the motorcycle 1 can include an air cleaner 11 that accommodates an element 12. The element 12 can clean air that is sucked into the intake duct 14. FIG. 6B illustrates a state in which the shroud 50 is removed, as compared to a state shown in FIG. 6A, where the shroud 50 is present. As illustrated in FIG. 6B, the air cleaner 11 can be provided inward of the upper shroud 51 (e.g., inward of the intake duct 14). The air taken in through the intake duct 14 can be cleaned by the element 12 of the air cleaner 11 and introduced to the engine 7. Note that the periphery of the air cleaner 11 is shown in the cross-sectional view of FIG. 6B.

Referring to FIG. 5, the motorcycle 1 can include a radiator 15, disposed inward of the shroud 50. The radiator 15 can include a radiator tank 16. A coolant for cooling the engine 7 can be stored in the radiator tank 16. It should be noted that the engine 7 is not limited to being a radiator-cooled engine. Alternatively, for example, the engine 7 can be an air-cooled engine.

Referring now to FIGS. 6A and 6B, the fuel tank 5 can be disposed rearward of the head pipe 21. As illustrated in FIG. 6B, a portion of the fuel tank 5 and a portion of the air cleaner 11 can overlap, e.g., vertically. That is, a portion of an upper part of the air cleaner 11 can be covered by a portion of the fuel tank 5. In addition, a tank cover 13 can be disposed at the rear of the upper shroud 51 and the lower shroud 52, as viewed from one side of the motorcycle. The tank cover 13 can cover a side of at least a portion of the fuel tank 5.

Operations and Effects

As described above, the shroud 50 according to the first exemplary embodiment can include the front end portion 53, the front edge portion 54, the vertical portion 55, and the lower edge portion 56. In the shroud 50, the front end portion 53 can protrude frontward, and be located above the lower end 43b of the under bracket 43 and frontward of the rear end 40b of the front fork 40. Since the front end portion 53 is located at a higher and more frontward position than in conventional structures, the shroud 50 can take in a greater amount of air from the front.

To further review, the lower edge portion 56 can extend rearward, substantially horizontally, from the upper end 55t of the vertical portion 55, and extend astride the vehicle body frame 20. Thus, the motorcycle 1 can discharge the air taken inside the shroud 50 smoothly toward the rear. The vertical portion 55 can extend substantially vertically upward from a location rearward of the lower end 54b of the front edge portion 54, and can have a vertical extent that is relatively large. The larger the vertical extent of the vertical portion 55 (in other words, the higher the height thereof) is, the more the amount of the air flowing through the shroud 50 to the rear will be. Accordingly, the first exemplary embodiment can provide a motorcycle that, as compared to conventional arrangements, can take a greater amount of air inside the shroud from the front, and moreover, smoothly discharge the air that has been taken inside to the rear of the shroud 50. When the amount of the air flowing from the shroud 50 to the rear increases and is smoothly discharged as is made possible according to the first exemplary embodiment, the cooling performance of the engine 7, which is located behind the shroud 50, can improve.

As still further review, the vertical portion 55 can be located at a position spaced frontward from the cylinder 8, as viewed from one side of the motorcycle. Since the vertical portion 55 of the shroud 50 can be spaced from the cylinder 8 in this way, the air taken inside the shroud 50 can be smoothly discharged from the shroud 50 more easily.

Moreover, as described previously, the lower edge portion 56 of the shroud 50 can be located at a position spaced upward from the cylinder 8, as viewed from one side of the motorcycle, further assisting in smoothly discharging air taken inside the shroud 50.

Along similar lines, because the vertical portion 55 can be disposed at a position spaced frontward from the cylinder 8, along with the lower edge portion 56 being disposed at a position spaced upward from the cylinder 8, air taken inside the shroud 50 can be smoothly discharged from the shroud 50.

Additionally, as described in the foregoing, the motorcycle 1 can include a front fender 90, covering a region over the front wheel 3, and fitted to the under bracket 43. The front fender 90 can be stationary relative to the front fork 40.

Further, as described previously, the shroud 50 can include the upper shroud 51 and the lower shroud 52 located below the upper shroud 51. This structure can be economically advantageous for at least the reason that if either of the upper shroud 51 and the lower shroud 52 is damaged, only the damaged part need be replaced, instead of replacing the entire shroud 50.

To still further review, the main frame 22 can extend from the head pipe 21 obliquely downward and rearward, as viewed from one side of the motorcycle. In addition, the lower shroud 52 can be disposed so as to at least partly overlap the main frame 22, as viewed from one side of the motorcycle. As a result, the main frame 22 can be protected by the lower shroud 52.

In the first exemplary embodiment, the upper shroud 51 can be smaller than the lower shroud 52. As a result, the upper shroud 51 can be less likely to break than is the lower shroud 52, even, for example, in an accident in a race, involving crush-type damage. This is advantageous for at least the reason that the lower shroud 52 can be easier and less expensive to replace than is the upper shroud 51.

To further review, in the shroud 50, the front end portion 53 can be formed in the upper shroud 51, and the front end portion of the lower shroud 52 can form a part of the front edge portion 54. Since the front end portion 53 of the shroud 50 can be located at a higher and more frontward position as compared to conventional arrangements, the upper shroud 51 can take in a greater amount of air from the front. Moreover, when the upper shroud 51 also includes the intake duct 14, the intake duct 14 can take in a greater amount of air.

To continue reviewing, the intake duct 14 and its function can be incorporated into the upper shroud 51. This can be advantageous by reducing the number of component parts of the motorcycle 1, since components have multiple functions.

As further described in the foregoing, the width W1 of the front end portion of the upper shroud 51 can be greater than the width W2 of the front end portion of the lower shroud 52 (see FIG. 5). Accordingly, the upper shroud 51 can have higher rigidity than the lower shroud 52. Therefore, the rider of the motorcycle 1 can more easily adjust contact pressure with the left and right upper shrouds 51, and change his/her riding position smoothly.

As described previously, the motorcycle 1 can include the air cleaner 11 accommodating the element 12, for introduction of a sufficient amount of air cleaned by the element 12 into the engine 7.

Moreover, the motorcycle 1 can include the fuel tank 5, as described previously. The fuel tank 5 can be disposed rearward of the head pipe 21. A portion of the fuel tank 5 and a portion of the air cleaner 11 can overlap each other, e.g., vertically. This can make it possible for the motorcycle 1 to be made more compact in a lengthwise direction.

As further review, the motorcycle 1 can include the tank cover 13. The tank cover 13 can be disposed at the rear of the upper shroud 51 and the lower shroud 52, as viewed from one side of the motorcycle, and at least partly cover a side of the fuel tank 5. Therefore, the shroud 50 does not need to cover the side of the fuel tank 5, so the size thereof can become correspondingly smaller. For this reason, if the tank cover 13 breaks, it is sufficient that only the tank cover 13 be replaced.

As still further review, in the first exemplary embodiment, the opening 60 can be formed in the shroud 50. The opening 60 can have the first side Sa extending from the top point T0 obliquely downward and rearward, as viewed from one side of the motorcycle, and the second side Sb extending from the top point T0 obliquely downward and rearward, as viewed from, one side of the motorcycle. Because of the opening 60, the shroud 50 can more smoothly discharge the air that has been taken inside.

Second Exemplary Embodiment

In the following, a motorcycle 1 according to a second exemplary embodiment will be described. In the description, parts and components common to both the second exemplary embodiment and the first exemplary embodiment will be denoted by the same reference numerals, and further description will be omitted.

Figure 8:
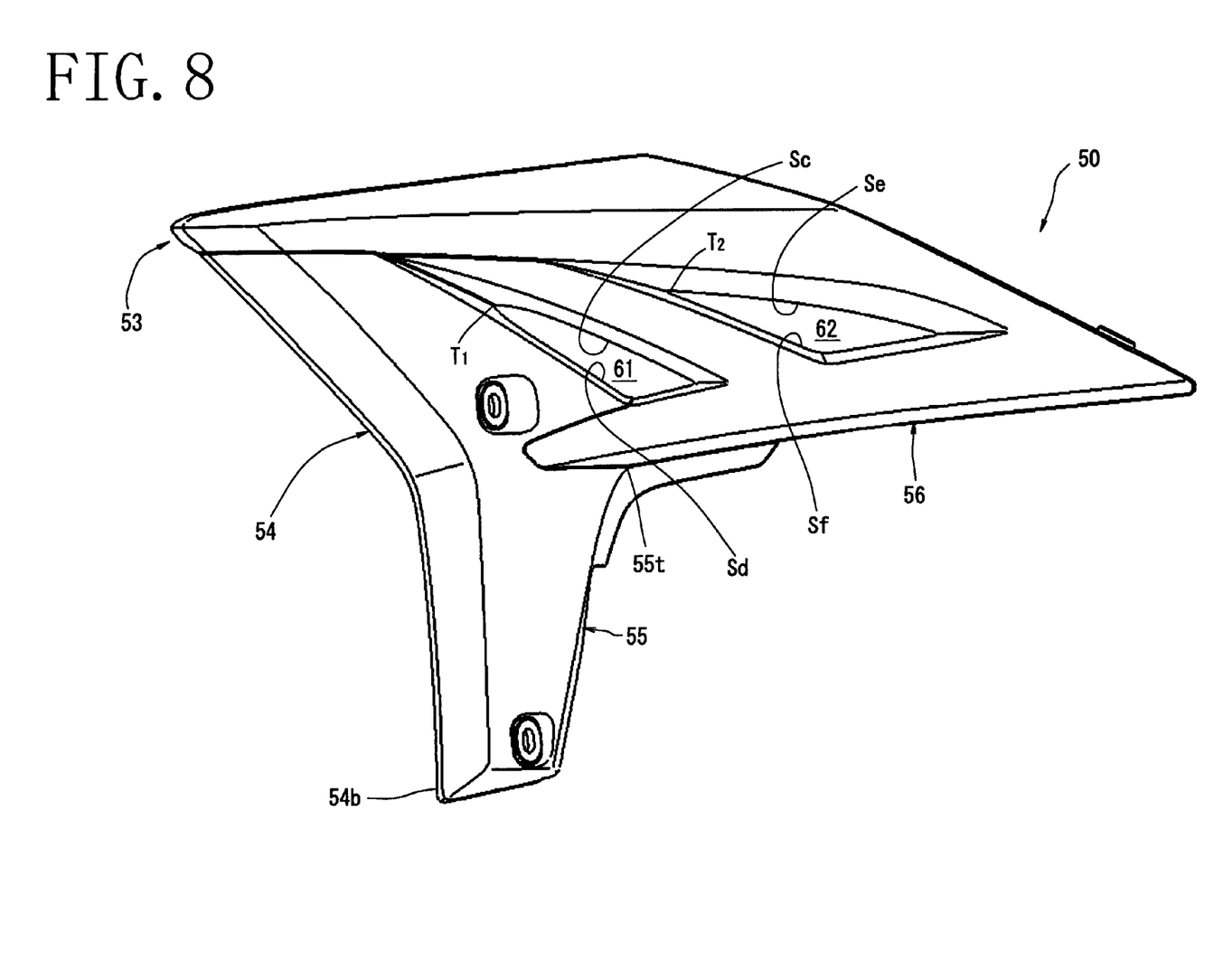
FIG. 8 is a side view illustrating a left-side shroud according to the second exemplary embodiment.

As illustrated in FIG. 8, according to the second exemplary embodiment, an opening 61 and an opening 62 can be formed in a shroud 50. The openings 61 and 62 can be substantially aligned along the front-to-rear direction. The opening 61 can have a first side Sc and a second side Sd, and be formed in a substantially triangular shape. The first side Sc can extend from a top point T1 obliquely downward and rearward. In a region below the first side Sc, the second side Sd can extend from the top point T1 obliquely downward and rearward.

Likewise, the opening 62 can have a first side Se and a second side Sf, and be formed in a substantially triangular shape. The first side Se can extend from a top point T2 obliquely downward and rearward. In a region below the first side Se, the second side Sf can extend from the top point T2 obliquely downward and rearward. The top point T1 can be located at a front end of the opening 61. The top point T2 is located at a front end of the opening 62.

Put another way, the shroud 50 can comprise a front projection defined at least partly by a front end portion 53, and further comprise a middle projection 55 and a rear projection defined at least partly by edge 56. In a side view of the shroud 50, the front projection can be approximately wedge-shaped, and the middle projection 55 can extend downward. Further, in a side view of the shroud 50, a first opening 61 and a second opening 62, each having an approximately triangular shape, can be formed, in approximately a center portion of the shroud 50. The first opening 61 can extend at least partly over the middle projection 55, and the second opening 62 can extend substantially along the rear projection.

The openings 61 and 62 formed in the shroud 50 can make it possible for the shroud 50 to more smoothly discharge air that has been taken inside.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A motorcycle comprising:
    a front wheel;
    a front fork for supporting the front wheel;
    an under bracket coupled to the front fork;
    a steering shaft coupled to the front fork via the under bracket;
    a head pipe for rotatably supporting the steering shaft;
    a body frame extending from the head pipe obliquely downward and rearward, as viewed from one side of the motorcycle;
    a shroud covering a side of a portion of the frame, extending frontward, and extending outward in a widthwise direction of the motorcycle; and
    a radiator disposed inward of the shroud;
    wherein, as viewed from one side of the motorcycle, the shroud comprises
        a front end portion located above a lower end of the under bracket and frontward of a rear end of the front fork;
        a front edge portion extending from the front end portion obliquely downward and rearward;
        a vertical portion extending substantially vertically upward from a location rearward of a lower end of the front edge portion; and
        a lower edge portion extending substantially horizontally rearward from an upper end of the vertical portion and extending astride the frame;
    wherein the front edge portion extends downward and along the radiator as viewed from the front side of the motorcycle; and
    wherein the front end portion is located above the radiator.

2. The motorcycle according to claim 1, further comprising:
    an engine having a cylinder;
    wherein the vertical portion of the shroud is located at a position spaced frontward from the cylinder, as viewed from one side of the motorcycle.

3. The motorcycle according to claim 1, further comprising:
    an engine having a cylinder;
    wherein the lower edge portion of the shroud is located at a position spaced upward from the cylinder, as viewed from one side of the motorcycle.

4. The motorcycle according to claim 2, wherein the lower edge portion of the shroud is located at a position spaced upward from the cylinder, as viewed from one side of the motorcycle.

5. The motorcycle according to claim 1, further comprising a front fender covering a region over the front wheel and being fitted to the under bracket.

6. The motorcycle according to claim 1, wherein the shroud includes an upper shroud, and a lower shroud located below the upper shroud.

7. The motorcycle according to claim 6, wherein:
    the body frame includes a main frame extending from the head pipe obliquely downward and rearward, as viewed from one side of the motorcycle, and a down frame extending from the head pipe obliquely downward and rearward in a region below the main frame; and
    the lower shroud at least partly overlaps the main frame, as viewed from one side of the motorcycle.

8. The motorcycle according to claim 6, wherein:
    the front end portion is formed in the upper shroud; and
    a front end portion of the lower shroud forms a part of the front edge portion.

9. The motorcycle according to claim 6, wherein the upper shroud includes at least a portion of an intake duct.

10. The motorcycle according to claim 8, wherein a width of the front end portion of the upper shroud along the widthwise direction is greater than a width of the front end portion of the lower shroud along the widthwise direction.

11. The motorcycle according to claim 9, further comprising an air cleaner associated with the intake duct.

12. The motorcycle according to claim 11, further comprising:
    a fuel tank disposed rearward of the head pipe;
    wherein a portion of the fuel tank and a portion of the air cleaner overlap each other.

13. The motorcycle according to claim 6, further comprising:
    a fuel tank disposed rearward of the head pipe; and
    a tank cover disposed rearward of the upper shroud and the lower shroud, as viewed from one side of the motorcycle, and at least partly covering a side of the fuel tank.

14. The motorcycle according to claim 1, wherein the shroud has formed therein at least one substantially triangular-shaped opening having a first side extending from a predetermined top point obliquely downward and rearward, as viewed from one side of the motorcycle, and a second side extending from the top point obliquely downward and rearward, as viewed from one side of the motorcycle.

15. The motorcycle according to claim 14, wherein the shroud has two openings formed therein, each being substantially triangular-shaped and having a first side extending from a predetermined top point obliquely downward and rearward, as viewed from one side of the motorcycle, and a second side extending from the top point obliquely downward and rearward, as viewed from one side of the motorcycle.

16. A motorcycle comprising:
a front wheel;
a front fork for supporting the front wheel;
an under bracket coupled to the front fork;
a steering shaft coupled to the front fork via the under bracket;
a head pipe for rotatably supporting the steering shaft;
a body frame extending from the head pipe obliquely downward and rearward, as viewed from one side of the motorcycle;
a vehicle shroud covering a side of a portion of the frame, extending frontward, and extending outward in a widthwise direction of the motorcycle, a radiator being disposed inward of the vehicle shroud; the vehicle shroud comprising:
an upper portion including an upper front portion;
a lower portion including a lower front portion;
in a side view of the vehicle shroud, the upper front portion and the lower front portion together forming a forward-projecting wedge shape;
the lower portion, in approximately a middle part thereof, including a downward-projecting portion;
the downward-projecting portion extending downward and along the radiator as viewed from the front side of the motorcycle; and
the upper front portion being located above the radiator.

17. The motorcycle of claim 16, the lower portion further including a rearward-projecting portion in a side view of the vehicle shroud.

18. The motorcycle of claim 16, wherein an opening having an approximately triangular shape is formed in the lower portion.

19. A vehicle shroud comprising:
a front projection;
a middle projection; and
a rear projection;
wherein, in a side view of the vehicle shroud,
the front projection is approximately wedge-shaped;
the middle projection extends downward;
the length of the middle projection is longer than the length of the front projection;
the length of the middle projection is longer than the length of the rear projection;
a first opening extends at least partly over the middle projection; and
a second opening extends substantially along the rear projection.

20. The vehicle shroud of claim 19, wherein in a side view of the vehicle shroud, first and second openings each having an approximately triangular shape are formed in approximately a center portion of the vehicle shroud, the first opening extending at least partly over the middle projection and the second opening extending substantially along the rear projection.

* * * * *